United States Patent
Niemi et al.

(10) Patent No.: US 10,764,779 B2
(45) Date of Patent: Sep. 1, 2020

(54) APPARATUSES AND METHODS FOR MOBILITY MANAGEMENT (MM) CONGESTION CONTROL

(71) Applicant: MediaTek Singapore Pte. Ltd., Singapore (SG)

(72) Inventors: Marko Niemi, Oulu (FI); Matti Moisanen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/202,308

(22) Filed: Nov. 28, 2018

(65) Prior Publication Data

US 2019/0166517 A1 May 30, 2019

Related U.S. Application Data

(60) Provisional application No. 62/616,607, filed on Jan. 12, 2018, provisional application No. 62/591,282, filed on Nov. 28, 2017.

(51) Int. Cl.
*H04W 28/02* (2009.01)
*H04W 8/08* (2009.01)
(Continued)

(52) U.S. Cl.
CPC ......... *H04W 28/0215* (2013.01); *H04W 8/08* (2013.01); *H04W 60/005* (2013.01); *H04W 8/22* (2013.01)

(58) Field of Classification Search
CPC .. H04W 28/0215; H04W 60/005; H04W 8/08
(Continued)

(56) References Cited

U.S. PATENT DOCUMENTS 9,894,465 B2  2/2018  Kim et al.
2012/0178457 A1*  7/2012  Liao ..................... H04W 76/18
                                                            455/437
(Continued)

FOREIGN PATENT DOCUMENTS

CN  104704875 A  6/2015
EP  2 728 925 A1  5/2014

OTHER PUBLICATIONS

"5G NAS level congestion control general description;" 3GPP TSG-CT WG1 Meeting #107; Nov.-Dec. pp. 1-5.
(Continued)

*Primary Examiner* — Inder P Mehra
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a first service network utilizing a first Radio Access Technology (RAT) and a second service network utilizing a second RAT. The controller starts a Mobility Management (MM) back-off timer in response to a first MM procedure with the first service network being rejected, determines whether both the UE and the first service network support a dual registration mode in response to starting the MM back-off timer, and initiates a second MM procedure with the second service network via the wireless transceiver when the MM back-off timer is running, in response to determining that both the UE and the first service network support the dual registration mode.

16 Claims, 7 Drawing Sheets

(51) Int. Cl.
*H04W 60/00* (2009.01)
*H04W 8/22* (2009.01)

(58) Field of Classification Search
USPC .................................................. 455/435.1
See application file for complete search history.

(56) References Cited

U.S. PATENT DOCUMENTS

| 2015/0358857 | A1* | 12/2015 | Duan | H04W 28/08 |
| | | | | 370/237 |
| 2017/0289042 | A1 | 10/2017 | Niemi et al. | |
| 2019/0037516 | A1* | 1/2019 | Kim | H04W 60/00 |
| 2019/0124717 | A1* | 4/2019 | Choi | H04W 76/34 |

OTHER PUBLICATIONS

"P-CR for 5GMM NAS level congestion control;" 3GPP TSG-CT WG1 Meeting #107; Nov.-Dec. 2017; pp. 1-2.
"Handling of NAS level mobility management congestion control" 3GPP TSG-CT WG1 Meeting #107; Nov.-Dec. 2017; pp. 1-2.
"Support for Congestion control;" SA WG2 Meeting #123; Oct. 2017; pp. 1-3.
"System Architecture for the 5G System;" 3rd Generation Partnership Project; Technical Specification Group Services and System Aspects; System Architecture for the 5G System; Stage 2 (Release 15); May 2017; pp. 1-170.

* cited by examiner

APPARATUSES AND METHODS FOR MOBILITY MANAGEMENT (MM) CONGESTION CONTROL

CROSS REFERENCE TO RELATED APPLICATIONS

This Application claims priority of U.S. Provisional Application No. 62/591,282, filed on Nov. 28, 2017, the entirety of which is incorporated by reference herein. Also, this application claims priority of U.S. Provisional Application No. 62/616,607, filed on Jan. 12, 2018, the entirety of which is incorporated by reference herein.

BACKGROUND OF THE APPLICATION

Field of the Application

The application generally relates to congestion control techniques, and more particularly, to apparatuses and methods for Mobility Management (MM) congestion control.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, fifth-generation (5G) New Radio (NR) technology, and others.

According to the 3rd Generation Partnership Project (3GPP) specifications and/or requirements in compliance with the fourth generation (4G) technology (e.g., the LTE/LTE-A technology) or the 5G NR technology, a UE may initiate a Mobility Management (MM) procedure for attaching to a service network for obtaining wireless services, requesting resources for wireless services, or updating its location to the service network. However, in case of insufficient resources in the requested service network (e.g., congestion in the service network), the service network may reject the MM procedure with an MM back-off timer for the UE to count a period of time during which the UE is prohibited from initiating any MM procedure with the service network, so that further congestion in the service network may be avoided.

However, the 3GPP does not specify how to handle MM congestion control in the following situations. For the 5G interworking architecture with the 3G/4G system, the interoperability of the 5G MM back-off timer and the 3G/4G MM back-off timer should be defined. For another situation where the UE is connected to two 5G NR networks via a 3GPP access and a non-3GPP access, the MM congestion control across these two 5G NR networks over different types of access should be defined. Otherwise, the MM congestion control mechanism would be impaired, causing further network congestion and prolonging the time required by the UE to obtain wireless services in these situations.

BRIEF SUMMARY OF THE APPLICATION

In a first aspect of the application, a User Equipment (UE) comprising a wireless transceiver and a controller is provided. The wireless transceiver is configured to perform wireless transmission and reception to and from a first service network utilizing a first Radio Access Technology (RAT) and a second service network utilizing a second RAT. The controller is configured to start a Mobility Management (MM) back-off timer in response to a first MM procedure with the first service network being rejected, determine whether both the UE and the first service network support a dual registration mode in response to starting the MM back-off timer, and initiate a second MM procedure with the second service network via the wireless transceiver when the MM back-off timer is running, in response to determining that both the UE and the first service network support the dual registration mode.

In a second aspect of the application, a method for Mobility Management (MM) congestion control, executed by a UE communicatively connected to a first service network utilizing a first Radio Access Technology (RAT) and a second service network utilizing a second RAT. The method comprises the steps of: starting an MM back-off timer in response to a first MM procedure with the first service network being rejected; determining whether both the UE and the first service network support a dual registration mode in response to starting the MM back-off timer; and initiating a second MM procedure with the second service network when the MM back-off timer is running, in response to determining that both the UE and the first service network support the dual registration mode.

In a third aspect of the application, a UE comprising a wireless transceiver and a controller is provided. The wireless transceiver is configured to perform wireless transmission and reception to and from a first service network located in a first Public Land Mobile Network (PLMN) via one of a 3rd Generation Partnership Project (3GPP) access and a non-3GPP access, and a second service network located in a second PLMN via the other of the 3GPP access and the non-3GPP access. The controller is configured to start a first Mobility Management (MM) back-off timer in response to a first MM procedure with the first service network being rejected, determine whether the first PLMN and the second PLMN are equivalent PLMNs in response to starting the first MM back-off timer, and initiate a second MM procedure with the second service network via the wireless transceiver when the first MM back-off timer is running, in response to determining that the first PLMN and the second PLMN are not equivalent PLMNs.

In a fourth aspect of the application, a method for MM congestion control, executed by a UE communicatively connected to a first service network located in a first PLMN via one of a 3GPP access and a non-3GPP access, and a second service network located in a second PLMN via the other of the 3GPP access and the non-3GPP access. The method comprises the steps of: starting a first MM back-off timer in response to a first MM procedure with the first service network being rejected; determining whether the first PLMN and the second PLMN are equivalent PLMNs in response to starting the first MM back-off timer; and initiating a second MM procedure with the second service network when the first MM back-off timer is running, in response to determining that the first PLMN and the second PLMN are not equivalent PLMNs.

Other aspects and features of the present application will become apparent to those with ordinarily skill in the art upon review of the following descriptions of specific embodiments of the UEs and the methods for MM congestion control.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
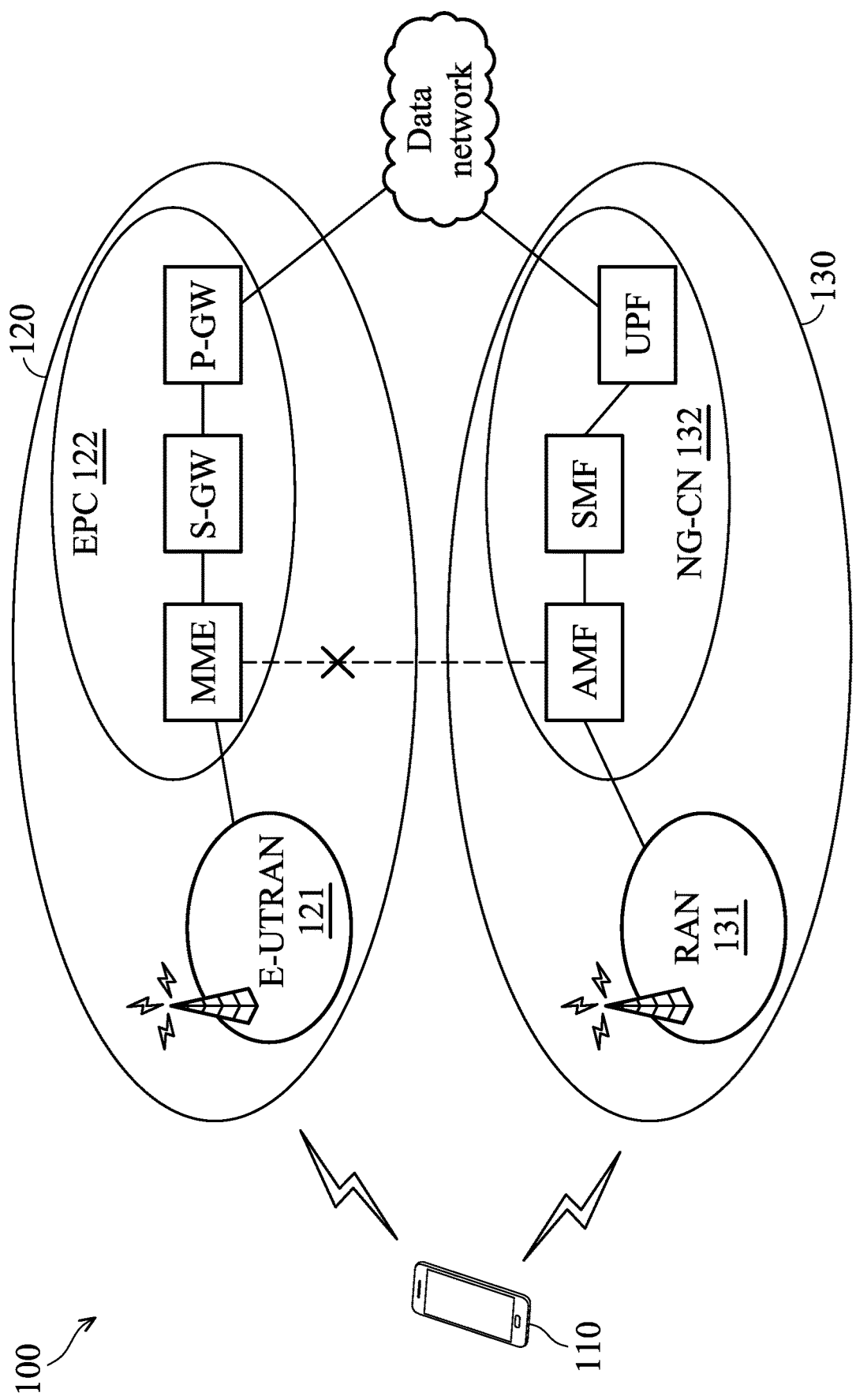
FIG. 1 is a block diagram of a wireless communication environment according to an embodiment of the application.

FIG. 1 is a block diagram of a wireless communication environment according to an embodiment of the application.

The wireless communication environment 100 includes a User Equipment (UE) 110, an LTE network 120, and a 5G NR network 130, wherein the UE 110 is wirelessly connected to one or both of the LTE network 120 and the 5G NR network 130.

In particular, the LTE network 120 and the 5G NR network 130 support interworking without the N26 interface (i.e., the communication interface between the Mobility Management Entity (MME) in the LTE network 120 and the Access and Mobility Function (AMF) in the 5G NR network 130). That is, both the UE 110 and the network side, including the LTE network 120 and the 5G NR network 130, support the dual registration mode. When the UE 110 that supports the dual registration mode is registered with both the LTE network 120 and the 5G NR network 130, the UE 110 keeps independent registration for the LTE network 120 and the 5G NR network 130.

The UE 110 may be a feature phone, a smartphone, a tablet PC, a laptop computer, or any wireless communication device supporting the RATs utilized by the LTE network 120 and the 5G NR network 130.

The LTE network 120 includes an Evolved-Universal Terrestrial Radio Access Network (E-UTRAN) 121 and an Evolved Packet Core (EPC) 122. The E-UTRAN 121 is responsible for processing radio signals, terminating radio protocols, and connecting the UE 110 with the EPC 122, while the EPC 122 is responsible for performing mobility management, network-side authentication, and interfaces with a public/external data network (e.g., the Internet). The E-UTRAN 121 may include at least one evolved NodeB (eNB) (e.g., macro eNB, femto eNB, or pico eNB). The EPC 122 may include at least an MME, a Serving Gateway (S-GW), and a Packet Data Network Gateway (P-GW). Although not shown, the EPC 122 may further include a Home Subscriber Server (HSS).

The 5G NR network 130 includes a Next Generation Radio Access Network (NG-RAN) 131 and a Next Generation Core Network (NG-CN) 132. The NG-RAN 131 is responsible for processing radio signals, terminating radio protocols, and connecting the UE 110 with the NG-CN 132, while the NG-CN 132 is responsible for performing mobility management, network-side authentication, and interfaces with a public/external data network (e.g., the Internet). The NG-RAN 131 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases. The NG-CN 132 generally consists of various network functions, including at least an AMF, a Session Management Function (SMF), and a User Plane Function (UPF), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

Although not shown, the NG-CN 132 may further include a Policy Control Function (PCF), an Application Function (AF), and an Authentication Server Function (AUSF). The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the 5G interworking architecture with the 4G system depicted in FIG. 1 is for illustrative purposes only and is not intended to limit the scope of the application. For example, the application may also be applied to 5G interworking architecture with the 3G system.

Figure 2:
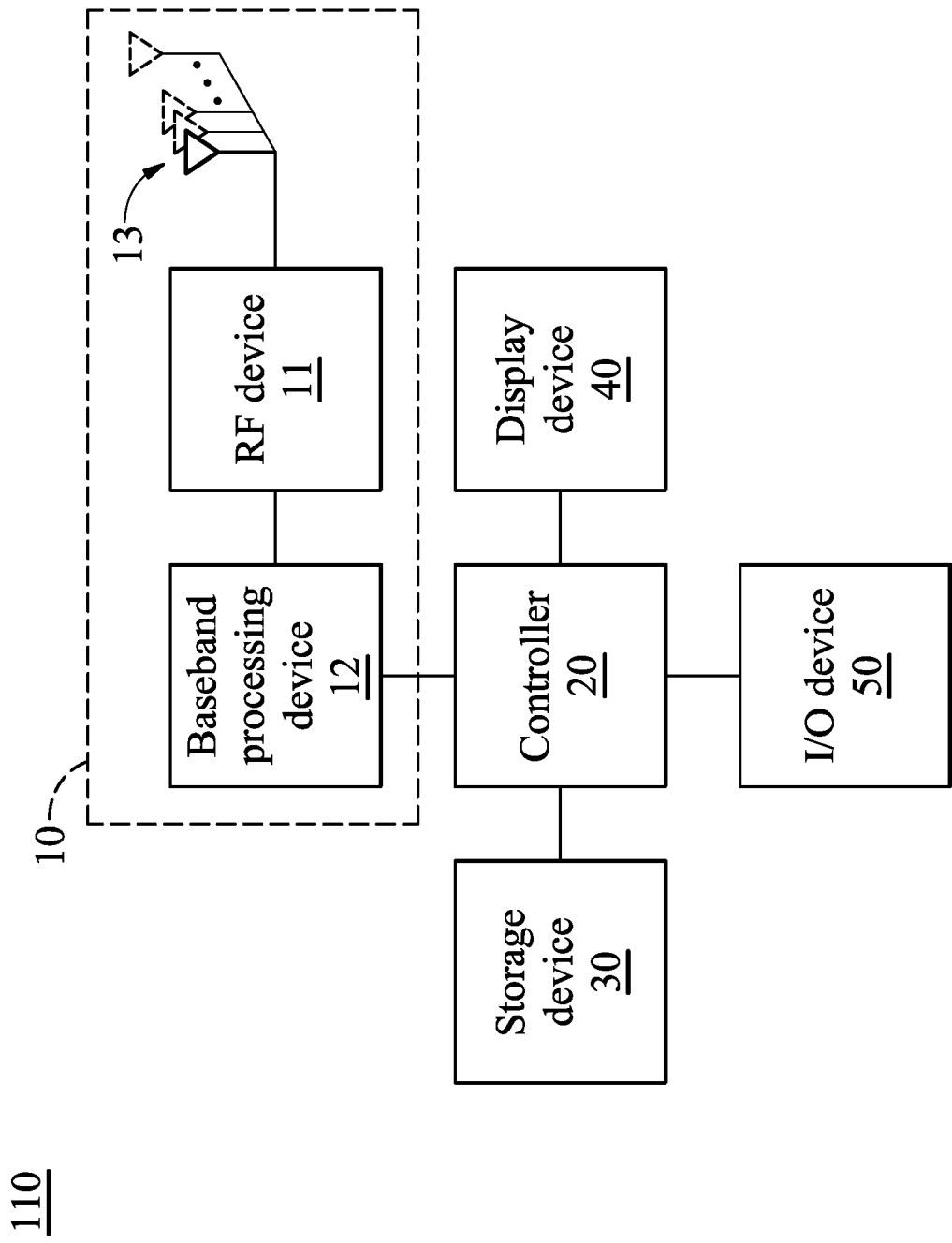
FIG. 2 is a block diagram illustrating the UE 110 according to an embodiment of the application.

FIG. 2 is a block diagram illustrating the UE 110 according to an embodiment of the application.

The UE 110 includes a wireless transceiver 10, a controller 20, a storage device 30, a display device 40, and an Input/Output (I/O) device 50.

The wireless transceiver 10 is configured to perform wireless transmission and reception to and from the E-UTRAN 121 and/or the NG-RAN 131. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported cellular technologies, wherein the radio frequency may be 900 MHz, 1900 MHz or 2100 MHz utilized in 3G systems, or 900 MHz, 2100 MHz, or 2.6 GHz utilized in 4G systems, or any radio frequency (e.g., 30 GHz-300 GHz for mmWave) utilized in 5G systems, or another radio frequency, depending on the RAT in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the E-UTRAN 121 and/or the NG-RAN 131, storing and retrieving data (e.g., program code) to and from the storage device 30, sending a series of frame data (e.g. representing text messages, graphics, images, etc.) to the display device 40, and receiving/outputting signals from/to the I/O device 50. In particular, the controller 20 coordinates the aforementioned operations of the wireless transceiver 10, the storage device 30, the display device 40, and the I/O device 50 for performing the method for MM congestion control.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method for MM congestion control. Alternatively, the method for MM congestion control may be implemented as part of the communication protocols.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 3:
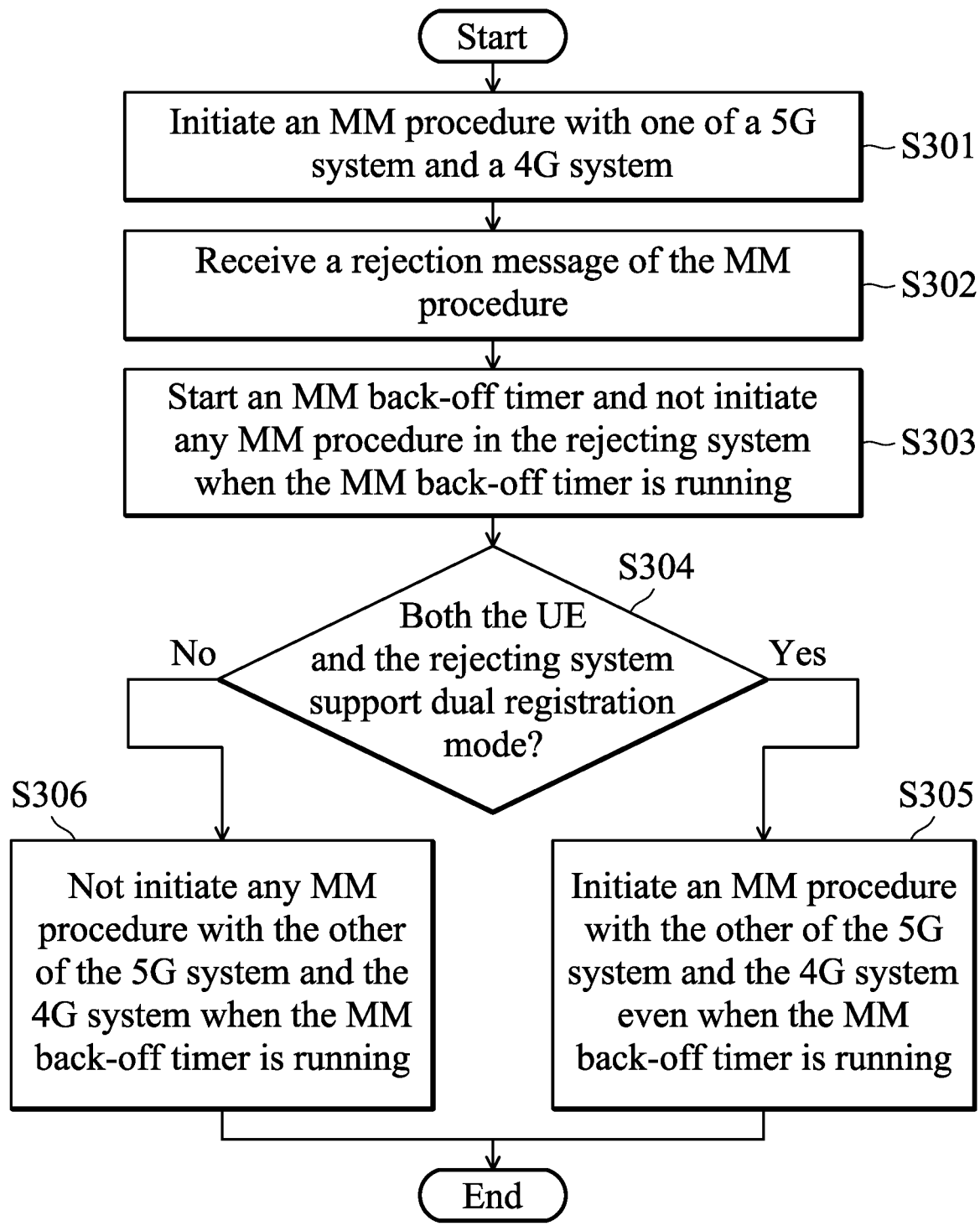
FIG. 3 is a flow chart illustrating the method for MM congestion control according to an embodiment of the application.

FIG. 3 is a flow chart illustrating the method for MM congestion control according to an embodiment of the application.

In this embodiment, the method for MM congestion control is executed by a UE (e.g., the UE 110) which is wirelessly connected to one or both of a 5G system (e.g., the 5G NR network 130) and a 4G system (e.g., the LTE network 120), wherein the interworking between the 5G system and the 4G system is operated without the N26 interface, and the UE supports the dual registration mode of operations with the 5G system and the 4G system.

To begin with, the UE may initiate an MM procedure with one of the 5G system and the 4G system (step S301). The MM procedure may be an Initial registration procedure, a mobility and periodic registration update procedure, or a Service Request procedure.

Next, the UE may receive a rejection message of the MM procedure, which includes a value of an MM back-off timer (step S302). In response to the rejection message, the UE may start the MM back-off timer, and when the MM back-off timer is running, the UE is prohibited from initiating any MM procedure in this system (step S303).

Subsequently, in response to starting the MM back-off timer, the UE may determine whether both the UE and the rejecting system support the dual registration mode (step S304). Specifically, the UE may know if it supports the dual registration mode based on the UE's capabilities, and may know if the rejecting system supports the dual registration mode based on a registration response (e.g., the rejection message or a previously received message) from the rejecting system.

In response to determining that both the UE and the rejecting system support dual registration mode, the UE may initiate an MM procedure with the other of the 5G system and the 4G system even when the MM back-off timer is running (step S305).

In response to determining that not both the UE and the rejecting system support the dual registration mode (i.e., either the UE or the rejecting system supports single registration mode), the UE may not initiate any MM procedure with the other of the 5G system and the 4G system when the MM back-off timer is running (step S306).

Subsequent to steps S305 and S306, the method ends.

In one embodiment, the UE may maintain separate MM back-off timers for the 5G system and the 4G system (e.g., T3346 for the 4G system, and T3546 for the 5G system). When the MM back-off timer for one system (e.g., T3546 for the 5G system) is started, the determination in step S304 is performed to decide whether the MM back-off timer for another system (e.g., T3346 for the 4G system) should be started also. That is, the MM back-off timer for another system should be started also in step S306.

Alternatively, the UE may maintain one MM back-off timer per system, and record timer information of each MM back-off timer, which indicates whether the MM back-off timer is applicable for only one system or for both systems.

In another embodiment, the rejection message received in step S302 may further include an indication of whether the MM back-off timer is applicable for only the rejecting system or both systems, and step S305 may be performed in response to the indication indicating that the MM back-off timer is applicable for only the rejecting system. Otherwise, step S306 is performed, in response to the indication indicating that the MM back-off timer is applicable for both systems.

In view of the forgoing embodiments of FIGS. 1 to 3, it will be appreciated that the present application realize interoperability of the 5G MM back-off timer and the 3G/4G MM back-off timer in the 5G interworking architecture with the 3G/4G system, by allowing the UE rejected by one system to initiate an MM procedure with another system if both the UE and the rejecting system support the dual registration mode. Advantageously, the time required by the UE to obtain wireless services may be reduced, without causing further congestion in the congested system.

Figure 4:
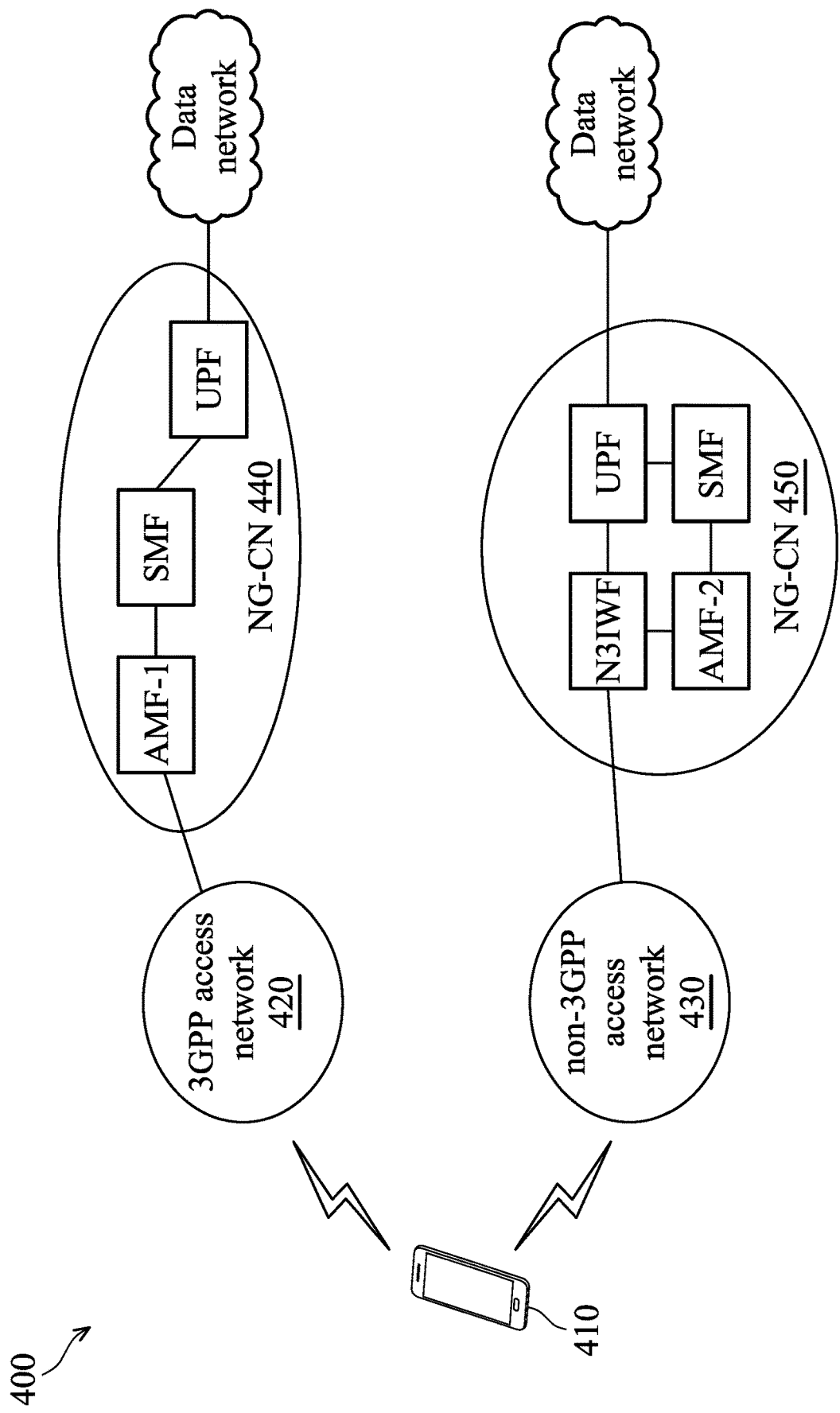
FIG. 4 is a block diagram of a wireless communication environment according to another embodiment of the application.

FIG. 4 is a block diagram of a wireless communication environment according to another embodiment of the application.

The wireless communication environment 400 includes a UE 410, a 3GPP access network 420, a non-3GPP access network 430, and two NR-CNs 440 and 450, wherein the UE 110 is wirelessly connected to one or both of the NR-CN 440 via the 3GPP access network 420 and the NR-CN 450 via the non-3GPP access network 430. In particular, the NR-CNs 440 and 450 are located in different Public Land Mobile Networks (PLMNs).

The UE 410 may be a feature phone, a smartphone, a tablet PC, a laptop computer, or any wireless communication device supporting the RATs utilized by the 3GPP access network 420, the non-3GPP access network 430, and the NR-CNs 440 and 450. The detailed description of the UE 410 is omitted herein for brevity since it is similar to the UE 110 as described in the embodiment of FIG. 2.

The 3GPP access network 420 is an access network utilizing one of the RATs specified by 3GPP. For example, the 3GPP access network 420 may be a GSM EDGE Radio Access Network (GERAN), UTRAN, E-UTRAN, or NG-RAN.

The non-3GPP access network 430 is an access network utilizing one RAT not specified by 3GPP. For example, the non-3GPP access network 430 may be a Wireless-Fidelity (Wi-Fi) network, a WiMAX network, a CDMA network, or a fixed network (e.g., a Digital Subscriber Line (DSL) network).

The NG-CN 440 may include at least an AMF (denoted as AMF-1), a SMF, and a UPF, while the NG-CN 450 may include at least a Non-3GPP Inter-Working Function (N3IWF), an AMF (denoted as AMF-2), a SMF, and a UPF. The N3IWF enables the UE 410 to attach to the NG-CN 440 either via trusted non-3GPP access or via untrusted non-3GPP access. The detailed description of the AMF, SMF and UPF is omitted herein for brevity since they are similar to the AMF, SMF and UPF as described in the embodiment of FIG. 1.

Figure 5:
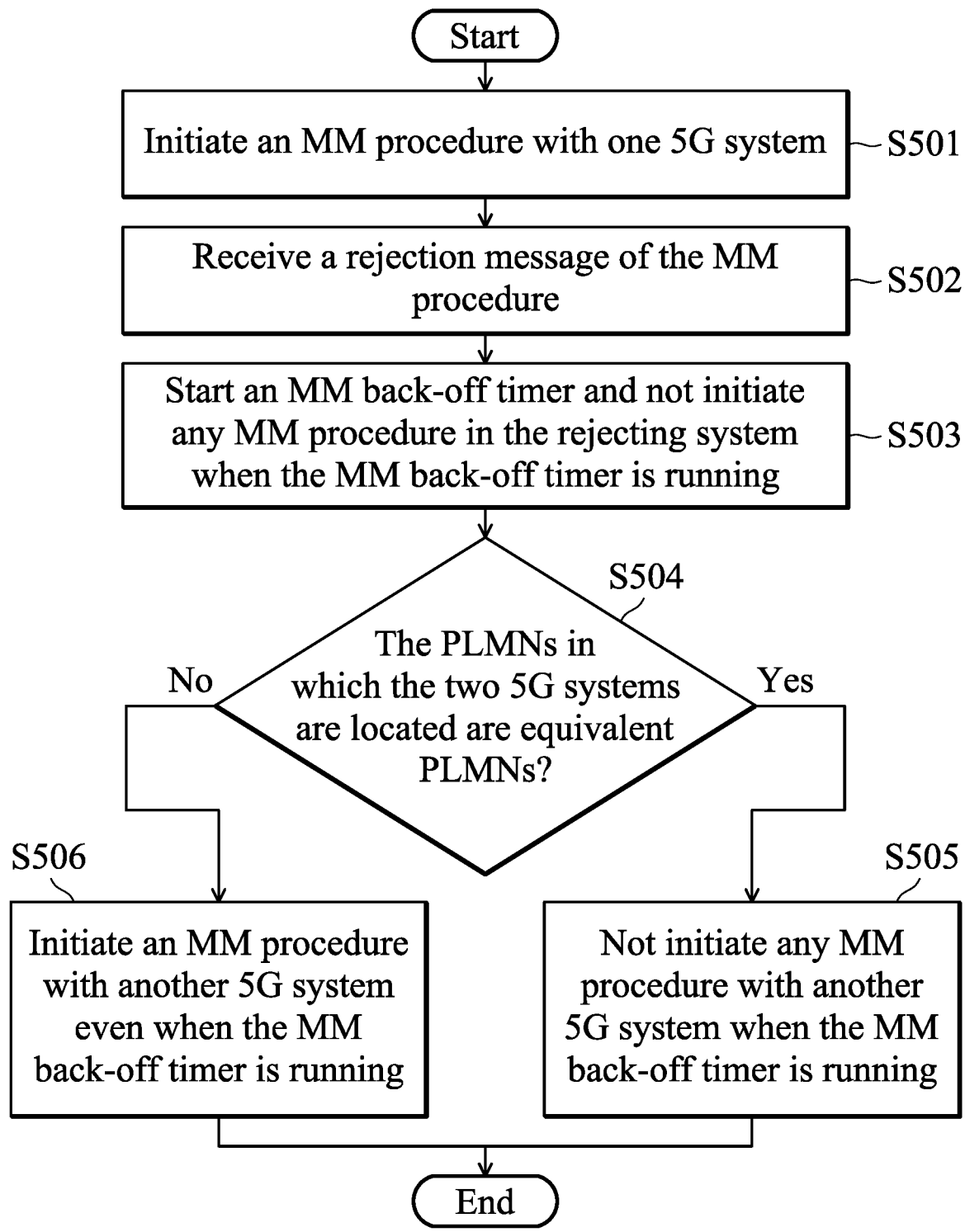
FIG. 5 is a flow chart illustrating the method for MM congestion control according to another embodiment of the application.

FIG. 5 is a flow chart illustrating the method for MM congestion control according to another embodiment of the application.

In this embodiment, the method for MM congestion control is executed by a UE (e.g., the UE 410) which is wirelessly connected to one 5G system (e.g., the NG-CN 440) via a 3GPP access (e.g., the 3GPP access network 420) and another 5G system (e.g., NG-CN 450) via a non-3GPP access (e.g., the non-3GPP access network 430), wherein these two 5G systems are located in different PLMNs.

To begin with, the UE may initiate an MM procedure with one 5G system (step S501). The MM procedure may be an initial registration procedure, a mobility and periodic registration update procedure, or a service request procedure.

Next, the UE may receive a rejection message of the MM procedure, which includes a value of an MM back-off timer (step S502). In response to the rejection message, the UE may start the MM back-off timer, and when the MM back-off timer is running, the UE is prohibited from initiating any MM procedure in this 5G system (step S503).

Subsequently, in response to starting the MM back-off timer, the UE may determine whether the PLMNs in which the two 5G systems are located are equivalent PLMNs (step S504). Specifically, the UE may determine whether two PLMNs are equivalent PLMNs based on an Equivalent PLMN (E-PLMN) list which may be signaled to the UE during a Location Update procedure, a Routing Area Update procedure, or an Attach procedure.

In response to determining that the PLMNs are equivalent PLMNs, the UE may not initiate any MM procedure with another 5G system when the MM back-off timer is running (step S505).

In response to determining that the PLMNs are not equivalent PLMNs, the UE may initiate an MM procedure with another 5G system even when the MM back-off timer is running (step S506).

Subsequent to steps S505 and S506, the method ends.

In one embodiment, the UE may maintain one common MM back-off timer for 5G systems, and record if the MM back-off timer is applicable for only one access/PLMN or for both accesses in both PLMNs.

Alternatively, the UE may maintain separate MM back-off timers for each access/PLMN. When the MM back-off timer for the first access/PLMN is started, the UE is allowed to initiate an MM procedure over the second access/PLMN, and another MM back-off timer for the second access/PLMN is started if the MM procedure over the second access/PLMN is rejected too.

In another embodiment, the rejection message received in step S502 may further include an indication of whether the MM back-off timer is applicable for only one access/PLMN or for both accesses in both PLMNs, and step S506 may be performed in response to the indication indicating that the MM back-off timer is applicable for only one access/PLMN. Otherwise, the UE may not initiate any MM procedure with another 5G system when the MM back-off timer is running, in response to determining that the PLMNs are not equivalent PLMNs but the indication indicating that the MM back-off timer is applicable for both accesses in both PLMNs. In addition, the UE may initiate an MM procedure with another 5G system when the MM back-off timer is running, in response to determining that the PLMNs are equivalent PLMNs but the indication indicating that the MM back-off timer is applicable for only one access/PLMN.

Figure 6:
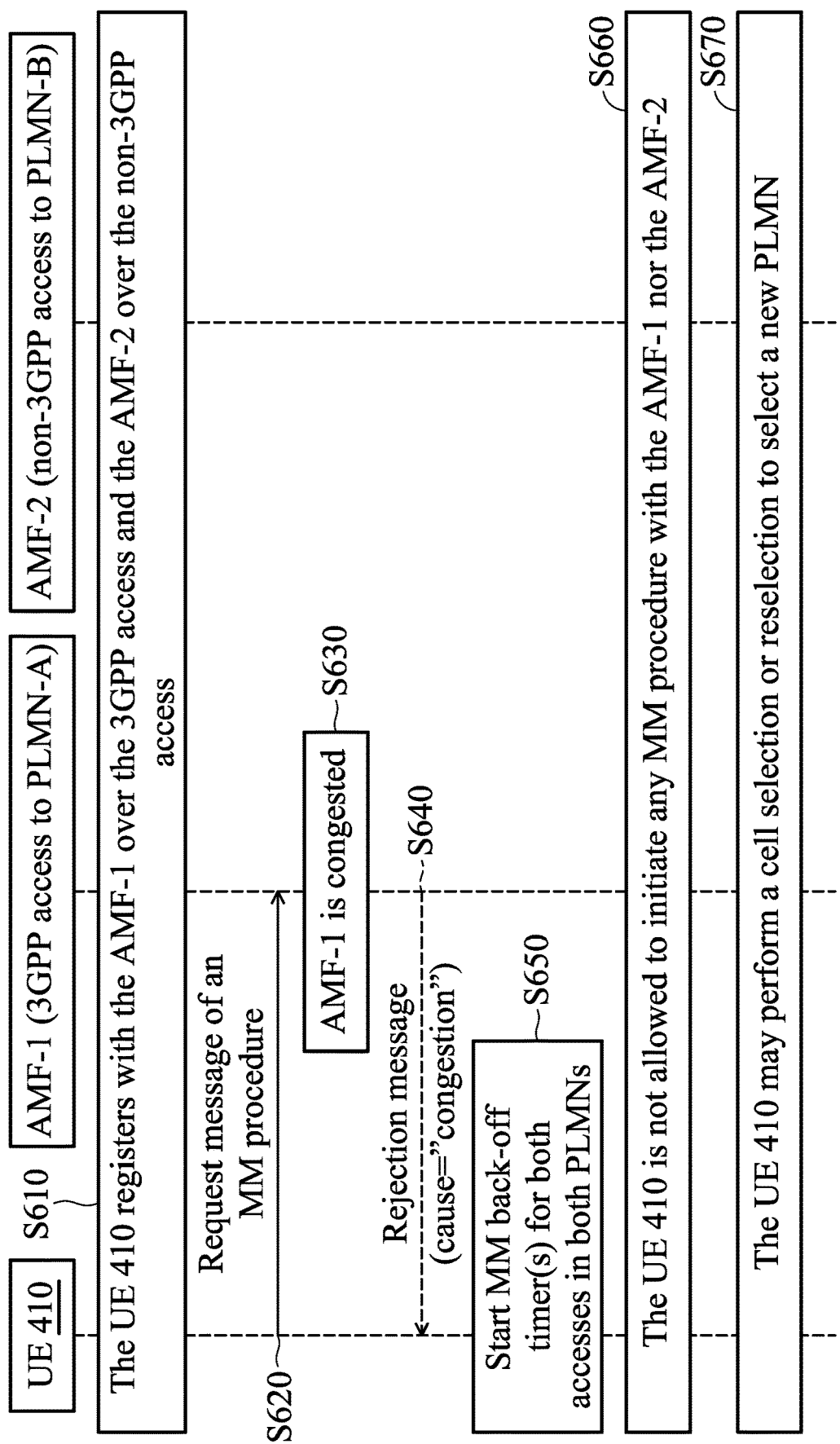
FIG. 6 is a message sequence chart illustrating the MM congestion control across two 5G systems to which the UE is connected over different types of access according to an embodiment of the application.

FIG. 6 is a message sequence chart illustrating the MM congestion control across two 5G systems to which the UE is connected over different types of access according to an embodiment of the application.

In this embodiment, the AMF-1 is located in PLMN-A and the AMF-2 is located in PLMN-B, wherein PLMN-A and PLMN-B are equivalent PLMNs.

In step S610, the UE 410 registers with the AMF-1 over the 3GPP access and the AMF-2 over the non-3GPP access.

In step S620, the UE 410 initiates an MM procedure with the AMF-1 by sending a request message to the AMF-1 via the 3GPP access. For example, the request message may be sent for mobility or periodic update.

In step S630, the MM procedure is rejected due to the occurrence of congestion in the AMF-1.

In step S640, the AMF-1 replies to the UE 410 with a rejection message including a rejection cause "congestion" and the value of the MM back-off timer.

In step S650, the UE 410 starts the MM back-off timer(s) for both accesses in both PLMNs.

In step S660, the UE 410 is not allowed to initiate any MM procedure with the AMF-1 nor the AMF-2, or any other 5G systems located in PLMN-A or PLMN-B.

In step S670, the UE 410 may perform a cell selection or reselection to select a new PLMN.

Figure 7:
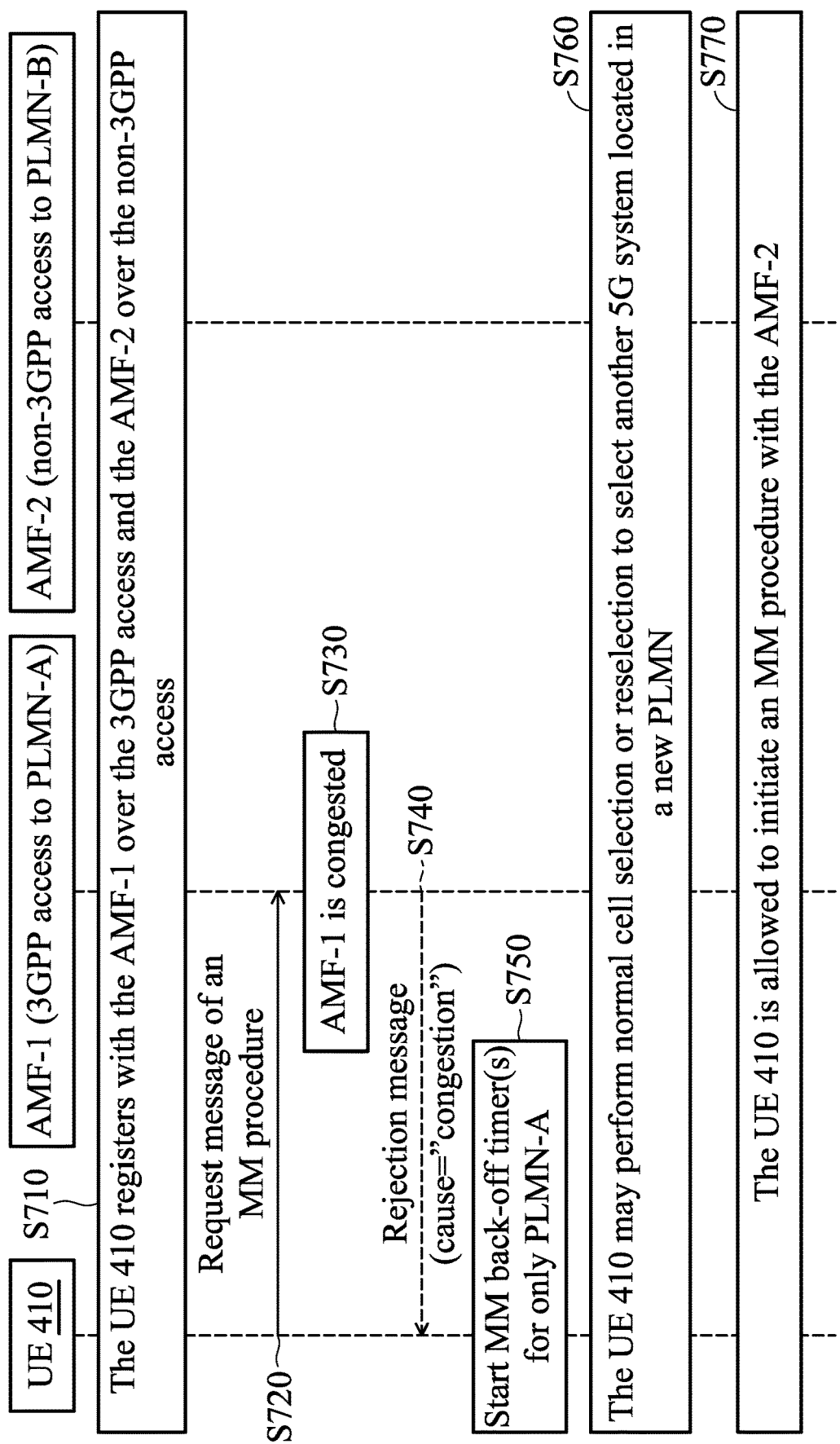
FIG. 7 is a message sequence chart illustrating the MM congestion control across two 5G systems to which the UE is connected over different types of access according to another embodiment of the application.

FIG. 7 is a message sequence chart illustrating the MM congestion control across two 5G systems to which the UE is connected over different types of access according to another embodiment of the application.

In this embodiment, the AMF-1 is located in PLMN-A and the AMF-2 is located in PLMN-B, wherein PLMN-A and PLMN-B are not equivalent PLMNs.

In step S710, the UE 410 registers with the AMF-1 over the 3GPP access and the AMF-2 over the non-3GPP access.

In step S720, the UE 410 initiates an MM procedure with the AMF-1 by sending a request message to the AMF-1 via the 3GPP access. For example, the request message may be sent for mobility or periodic update.

In step S730, the MM procedure is rejected due to the occurrence of congestion in the AMF-1.

In step S740, the AMF-1 replies to the UE 410 with a rejection message including a rejection cause "congestion" and the value of the MM back-off timer.

In step S750, the UE 410 starts the MM back-off timer(s) for only PLMN-A.

In step S760, the UE 410 may perform normal cell selection or reselection to select another 5G system located in a new PLMN. Meanwhile, the UE is not allowed to initiate MM procedure to PLMN-A, due to that the MM back-off timer(s) is/are running.

In step S770, the UE 410 is allowed to initiate an MM procedure with the AMF-2 since the started MM back-off timer is applicable for only PLMN-A.

In view of the forgoing embodiments of FIGS. 4 to 7, it will be appreciated that the present application realizes MM congestion control across two 5G systems to which the UE is connected over different types of access, by allowing the UE rejected by one 5G system to initiate an MM procedure with another 5G system if the PLMNs in which the two 5G systems are located are not equivalent PLMNs Advantageously, the time required by the UE to obtain normal services may be reduced, without causing further congestion in the congested system.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
   a wireless transceiver, configured to perform wireless transmission and reception to and from a first 5G service network located in a first Public Land Mobile Network (PLMN) via a 3rd Generation Partnership Project (3GPP) access, and a second 5G service network located in a second PLMN via a non-3GPP access; and
   a controller, configured to, start a first Mobility Management (MM) back-off timer for the 3GPP access in response to a first 5G MM procedure with the first 5G service network being rejected, determine whether the first PLMN and the second PLMN are equivalent PLMNs in an equivalent PLMN list in response to starting the first MM back-off timer, and initiate a second 5G MM procedure with the second 5G service network via the non-3GPP access when the first MM back-off timer is running, in response to determining that the first PLMN and the second PLMN are not equivalent PLMNs in the equivalent PLMN list.

2. The UE of claim 1, wherein the controller is further configured to start a second MM back-off timer for the non-3GPP access in response to the second 5G MM procedure with the second 5G service network being rejected.

3. The UE of claim 1, wherein the controller is further configured to not initiate any 5G MM procedure with the second 5G service network via the non-3GPP access when the first MM back-off timer is running, in response to determining that the first PLMN and the second PLMN are equivalent PLMNs.

4. The UE of claim 1, wherein the controller is further configured to not initiate any 5G MM procedure with the first 5G service network via the 3GPP access when the first MM back-off timer is running.

5. The UE of claim 1, wherein the controller is further configured to receive a rejection message of the first 5G MM procedure from the first 5G service network via the 3GPP access in response to the first 5G MM procedure being rejected, and the rejection message comprises an indication of whether the first MM back-off timer is applicable for only the 3GPP access or the first PLMN, or for both the 3GPP access and the non-3GPP access in both the first PLMN and the second PLMN.

6. The UE of claim 5, wherein the second 5G MM procedure is initiated in response to the indication of that the first MM back-off timer is applicable for only the 3GPP access or the first PLMN.

7. The UE of claim 5, wherein the controller is further configured to not initiate any 5G MM procedure with the second 5G service network via the non-3GPP access when the first MM back-off timer is running, in response to the indication of that the first MM back-off timer is applicable for both the 3GPP access and the non-3GPP access in both the first PLMN and the second PLMN.

8. The UE of claim 5, wherein the controller is further configured to initiate the second 5G MM procedure with the second 5G service network via the non-3GPP access when the first MM back-off timer is running, in response to determining that the first PLMN and the second PLMN are equivalent PLMNs with the indication of that the first MM back-off timer is applicable for only the 3GPP access or the first PLMN.

9. A User Equipment (UE), comprising:
a wireless transceiver, configured to perform wireless transmission and reception to and from a first 5G service network located in a first Public Land Mobile Network (PLMN) via a non-3rd Generation Partnership Project (3GPP) access, and a second 5G service network located in a second PLMN via a 3GPP access; and
a controller, configured to start a first Mobility Management (MM) back-off timer for the non-3GPP access in response to a first 5G MM procedure with the first 5G service network being rejected, determine whether the first PLMN and the second PLMN are equivalent PLMNs in an equivalent PLMN list in response to starting the first MM back-off timer, and initiate a second 5G MM procedure with the second 5G service network via the 3GPP access when the first MM back-off timer is running, in response to determining that the first PLMN and the second PLMN are not equivalent PLMNs in the equivalent PLMN list.

10. The UE of claim 9, wherein the controller is further configured to start a second MM back-off timer for the 3GPP access in response to the second 5G MM procedure with the second 5G service network being rejected.

11. The UE of claim 9, wherein the controller is further configured to not initiate any 5G MM procedure with the second 5G service network via the 3GPP access when the first MM back-off timer is running, in response to determining that the first PLMN and the second PLMN are equivalent PLMNs.

12. The UE of claim 9, wherein the controller is further configured to not initiate any 5G MM procedure with the first 5G service network via the non-3GPP access when the first MM back-off timer is running.

13. The UE of claim 9, wherein the controller is further configured to receive a rejection message of the first 5G MM procedure from the first 5G service network via the non-3GPP access in response to the first 5G MM procedure being rejected, and the rejection message comprises an indication of whether the first MM back-off timer is applicable for only the non-3GPP access or the first PLMN, or for both the 3GPP access and the non-3GPP access in both the first PLMN and the second PLMN.

14. The UE of claim 13, wherein the second 5G MM procedure is initiated in response to the indication of that the first MM back-off timer is applicable for only the non-3GPP access or the first PLMN.

15. The UE of claim 13, wherein the controller is further configured to not initiate any 5G MM procedure with the second 5G service network via the 3GPP access when the first MM back-off timer is running, in response to the indication of that the first MM back-off timer is applicable for both the 3GPP access and the non-3GPP access in both the first PLMN and the second PLMN.

16. The UE of claim 13, wherein the controller is further configured to initiate the second 5G MM procedure with the second 5G service network via the 3GPP access when the first MM back-off timer is running, in response to determining that the first PLMN and the second PLMN are equivalent PLMNs with the indication of that the first MM back-off timer is applicable for only the non-3GPP access or the first PLMN.

* * * * *